US008070588B1

(12) United States Patent
Muskin

(10) Patent No.: US 8,070,588 B1
(45) Date of Patent: Dec. 6, 2011

(54) CASHLESS SLOT MACHINE AND/OR AMUSEMENT DEVICE WITH SPECIAL FEATURES

(75) Inventor: Jon Muskin, Philadelphia, PA (US)

(73) Assignee: Olympian Gaming LLC, Beaverton, OR (US)

( * ) Notice: Subject to any disclaimer, the term of this patent is extended or adjusted under 35 U.S.C. 154(b) by 857 days.

(21) Appl. No.: 12/045,682

(22) Filed: Mar. 10, 2008

Related U.S. Application Data

(62) Division of application No. 10/771,081, filed on Feb. 4, 2004, now Pat. No. 7,341,518.

(51) Int. Cl.
*G06F 17/00* (2006.01)

(52) U.S. Cl. .......................................................... 463/20

(58) Field of Classification Search .............. 463/16–27, 463/29, 42, 43
See application file for complete search history.

(56) References Cited

U.S. PATENT DOCUMENTS

| | | | | |
|---|---|---|---|---|
| 6,110,044 | A * | 8/2000 | Stern | 463/29 |
| 6,729,958 | B2 * | 5/2004 | Burns et al. | 463/25 |
| 7,666,082 | B2 * | 2/2010 | Kane et al. | 463/17 |
| 7,819,742 | B2 * | 10/2010 | Chamberlain et al. | 463/25 |
| 2006/0068897 | A1 * | 3/2006 | Sanford et al. | 463/25 |
| 2009/0124354 | A1 * | 5/2009 | Acres | 463/25 |
| 2009/0191962 | A1 * | 7/2009 | Hardy et al. | 463/29 |
| 2010/0029376 | A1 * | 2/2010 | Hardy et al. | 463/25 |

* cited by examiner

*Primary Examiner* — Ronald Laneau
(74) *Attorney, Agent, or Firm* — Muskin & Cusick LLC

(57) ABSTRACT

A slot machine gaming device and method which targets a monetary ticket to operate in selected gaming devices. A video poker game can also provide a player with an improved paytable. The slot machine can also pay a player using a special ticket instead of cash.

3 Claims, 16 Drawing Sheets

Monetary Ticket Record

Sunny Vegas Casino

PROMOTIONAL TICKET

For Use in Grizzly Bear Slots Only

Value: $50

II I III I I I III I I II III I

Figure 5A

Sunny Vegas Casino

PROMOTIONAL TICKET

For Use in Grizzly Bear Slots Only

Play Value: $50
NO CASH VALUE

Play Required Before Cashin: $500 (or 50 spins at max bet)

II I III I I I IIII I III III I

Figure 5B

Sunny Vegas Casino

Value: $63.75

II I III I I II II I III II I

Figure 5C

CASHLESS SLOT MACHINE AND/OR AMUSEMENT DEVICE WITH SPECIAL FEATURES

CROSS REFERENCE TO RELATED APPLICATIONS

This Application is a divisional application of application Ser. No. 10/771,081, filed Feb. 4, 2004 now U.S. Pat. No. 7,341,518, which is incorporated by reference herein.

BACKGROUND OF THE INVENTION

1. Field of the Invention

The present invention is directed to a method, device, and computer readable storage medium for implementing a cashless casino promotional system. More particularly, the present invention allows for a monetary ticket to be targeted to a particular casino game, games, or categories or selections of games.

2. Description of the Related Art

Cashless wagering (also known as "ticket in ticket out") has become very popular in modern casinos. Monetary tickets can replace the traditional coins used to pay and get paid when playing slot machines.

A player can insert cash into a cash reader, a slot machine credits the player with an appropriate amount of credits, and the player can play using the credits. If the player wishes to cash out (a "ticket out" request), the player can press a button and the machine will dispense a ticket with a cash value corresponding to the amount of coins the player is entitled to. The player can then go to a cashier (or cash out machine) and cash in the ticket for cash, or insert the monetary ticket into another slot machine for continued play.

Casinos offer various types of promotions. For example, a casino may issue vouchers, whereupon a player can cash the voucher in at a casino for real coins. However, this system is inflexible in that the player may use the coin in any manner the player wishes.

What is needed is a new promotional method in which casinos can offer promotional monetary amounts to players with a more targeted approach to the use of the credits.

SUMMARY OF THE INVENTION

It is an aspect of the present invention to provide improvements and innovations in monetary ticket usage and promotions.

The above aspects can be obtained by a method that includes (a) associating a monetary ticket with a targeted type of slot machine; (b) reading a monetary ticket by a ticket reader associated with a current slot machine; and (c) crediting the monetary ticket, if the current slot machine is of the targeted type of slot machine.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which:

FIG. 5A is an example of a targeted ticket, according to an embodiment of the present invention;

FIG. 5B is an example of a targeted ticket with a playthrough requirement, according to an embodiment of the present invention;

FIG. 5C is an example of a standard ticket, according to an embodiment of the present invention;

DESCRIPTION OF THE PREFERRED EMBODIMENTS

Figure 1:
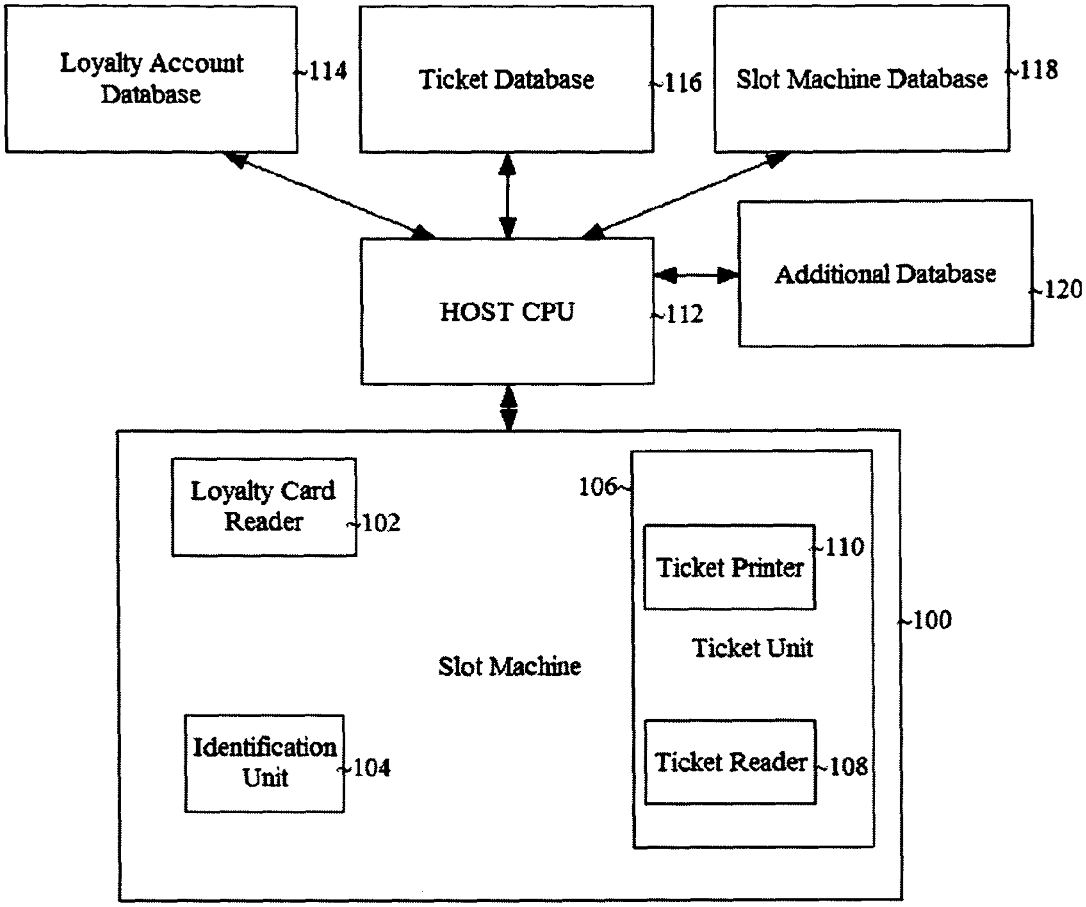
FIG. 1 is a block diagram illustrating an example of hardware used to implement the present invention, according to an embodiment of the present invention.

Reference will now be made in detail to the presently preferred embodiments of the invention, examples of which are illustrated in the accompanying drawings, wherein like reference numerals refer to like elements throughout.

The present invention relates to a promotional system for cashless slot machines. Cashless slot machines have been replacing slot machines which use coins. Cashless slot machines are preferred because the player no longer has to fuss with inserting, removing, carrying, and cashing in coins. Instead of coins, a player uses a paper ticket to cash in/out which is encoded with a bar code which has a specified monetary value.

In a first embodiment of the present invention, the present invention allows for a cashless ticket to be issued which is targeted to a particular slot machine. For example, a casino may have purchased a large amount of a new model of slot machines, and they wish to promote the new machines. The casinos can issue "targeted tickets" to selected players which have a specified playable value, but the targeted tickets can only be used on particular (or targeted) machines. The targeted machines can comprise a single line of machines, numerous models of machines, or a general category of machine (i.e. all or some types of video poker machines).

FIG. 1 is a block diagram illustrating an example of hardware used to implement the present invention, according to an embodiment of the present invention. It is noted that FIG. 1 represents just one example of hardware that can be used, and it is noted that additional hardware may be used, such as additional hosts, processors, connections, databases, etc. A connection to a particular unit also may include a connection to individual components of that unit. While FIG. 1 illustrates that one host is used to process data, additional processors, including some at the local slot machine level, may also be used.

A slot machine 100 contains a loyalty card reader 102, an identification unit 104, and a ticket unit 106. The loyalty card reader 102 reads a loyalty club card (or "slot club" card) from a player. The loyalty card contains data which identifies the player so the player's play can be tracked. The identification unit 104 identifies the particular slot machine, typically by number.

The ticket unit 106 comprises a ticket printer 110 and a ticket reader 112. The ticket reader 112 receives a cashless ticket from a player and typically scans a bar code therein so a record associates with the ticket can be identified. A value of the ticket is transmitted to a credit storage (not pictured) of the slot machine 100 so the player is credited with the value of the ticket. When the player wishes to cash out his or her credits, a new ticket is printed by the ticket printer 110.

The host CPU 112 receives the ticket in and ticket out requests, processes them, and provides the necessary signals to the ticket unit 106.

The host CPU 112 connects the slot machine to a loyalty account database 114. This database is used to update information regarding the player's play. It is also noted that a separate host CPU and connection may be used for this purpose.

The host CPU 112 also connects the slot machine to a ticket database 116. The ticket database 116 stores records associated with each ticket. Each ticket has a unique identification number associated with it. The ticket database 116 stores all of the ticket records, typically indexed by the identification number.

The host CPU 112 also connects the slot machine to a slot machine database 118. The slot machine database 118 can contain identification numbers and respective machine types, and can be used to determine if a particular slot machine is of a kind that is targeted. For example, if a ticket is targeted to a "grizzly slot machine," the slot machine database 118 can determine if a particular slot machine is a "grizzly slot machine." One way this can be done by retrieving an identification number identifying the slot machine from the identification unit 104 and then querying the slot machine database 118 to find the machine type from the identification number.

An example of how the first embodiment of the present invention works is as follows. A player inserts a targeted ticket targeted for a grizzly slot machine into the ticket reader 108. The ticket reader identifies a ticket identification number from a barcode on the ticket, and then transmits the ticket identification number to the host CPU 112. The host CPU 112 then transmits the ticket identification number to the ticket database 116 to and retrieves the targeted ticket's respective record. The record indicates that this is a promotional targeted ticket targeted for the grizzly slot machines. If this was not a promotional ticket, then the slot machine would be credited with the amount as normal.

Since this is a targeted ticket, the host CPU 112 then retrieves a slot machine identification number from the identification unit 104. The host CPU 112 then queries the slot machine database 118 with the identification number and receives the type of machine. If the type of machine is indeed a grizzly slot machine, then the host CPU 112 proceeds to process the ticket in transaction and credits the player with his or her credits. If the type of machine is not a grizzly slot machine, then the ticket is not credited, and the player may receive some type of message indicating that the ticket is not valid for that particular machine.

Types of machines can also include denominations. For example, a targeted ticket may only work in certain machines at the 0.25 denominational level. Alternatively, a targeted ticket may be targeted to just particular denominations. For example, a ticket can be targeted to all machines at the 0.25 level.

When a player properly uses a targeted ticket, the slot machine is then credited with the amount on the ticket. In one embodiment of the present invention, the player may then request a cashout and the machine can issue a standard ticket for the amount. Even if the player inserts a targeted ticket, then immediately cashes out for a standard ticket (which the player may then cash out for real money), the idea is that once a player if before a machine with credits the player will likely play the machine.

In a further embodiment of the present invention, a targeted ticket may not be transferable. A targeted ticket's respective record may contain a player ID number of a player which the ticket is limited to. Thus, before a player can use a targeted (or any other type of cashless ticket), the player may be required to insert the player's loyalty card for verification that the player is the player intended for the ticket. Thus, requiring the player's loyalty card to be inserted provides some additional security (although not completely foolproof since a player may come into possession of someone else's loyalty card) that the player is the one intended for the ticket.

A targeted ticket may be targeted to a machine type and or a particular time period as well. For example, a ticket may be only valid on a certain week of the year. If the week passes without being used, then the ticket becomes void.

Figure 2:
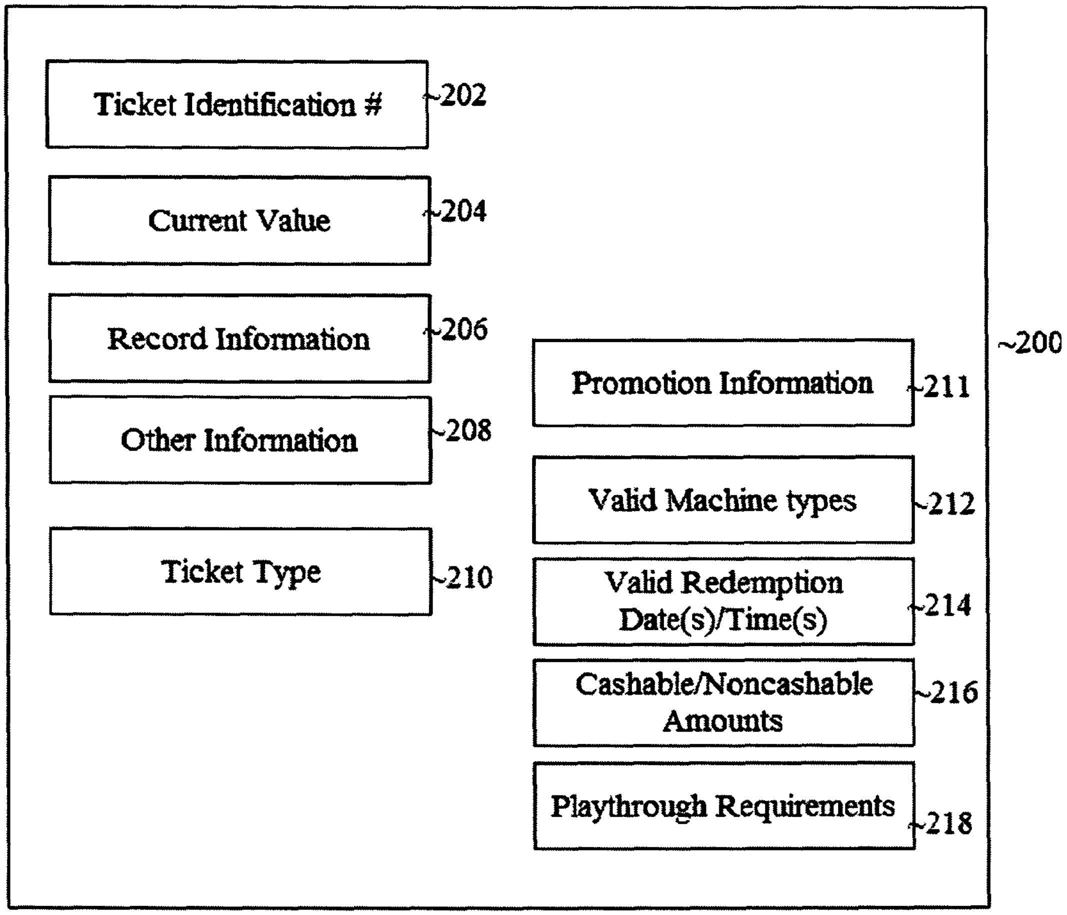
FIG. 2 illustrates a sample ticket database record, according to an embodiment of the present invention.

FIG. 2 illustrates a sample ticket database record, according to an embodiment of the present invention.

The ticket database 116 stores a record for every cashless ticket issued. The record contains all information about the respective ticket.

Ticket record 200 comprises a ticket identification number 202. This number is typically how each ticket record is indexed in the database, although it can also be indexed using other fields as well.

Current value 204 is the current monetary value of the ticket, for example $105.75. Record information 206 contains any additional information relevant to the record, for example dates/times created, the machine created on, etc. This can also contain information identifying a particular player that this ticket is directed to.

Other information 208 comprises additional information known in the art that such a record may contain.

The ticket type 210 is a field which can indicate whether this is a standard ticket type of a special ticket. A special ticket means the ticket has a special feature or limitation, including all of the special features and embodiments described herein.

If the ticket type 210 indicates this is a special ticket, then additional fields may be required which are needed by the special ticket. These additional fields can comprise valid machine types 212. This field is used by a targeted ticket and indicates which types of machines the ticket will work in. This can comprise either: particular machine ID(s) and/or machine model(s). To process such a targeted machine ticket, particular machine ID's can be checked by querying a particular machine or using a gaming machine database to match a listed particular machine ID with an actual machine. If machine models(s) are indicated in the record, then a gaming database can be used to identify particular machine IDs of that model(s). Communication to machines can be used by using a particular machine ID as an address, or another form of address (such as IP address) which corresponds to a particular machine ID. Valid redemption date(s)/time(s) 214 is a field which can indicate a temporal range (or just simply an expiration date) that a special (or promotional) ticket can be used. Cashable/noncashable amounts 216 indicates cashable/noncashable values for the ticket (to be discussed below in more detail). Playthrough requirements 218 indicates how much playthrough requirements are left before the ticket can be cashed out as a normal ticket (again to be discussed below in more detail).

Promotion information 211 includes any other information needed for a promotion, such as a modified paytable (as discussed below) or a pointer to such a table.

It is noted that a ticket record can contain any combination of the above fields, or additional fields not mentioned. It is also noted that the features of special tickets described herein can all be mixed and matched in any manner, for example a targeted ticket may (or may not) contain a valid temporal range optionally coupled with a playthrough requirement (or a noncashable amount).

Figure 3:
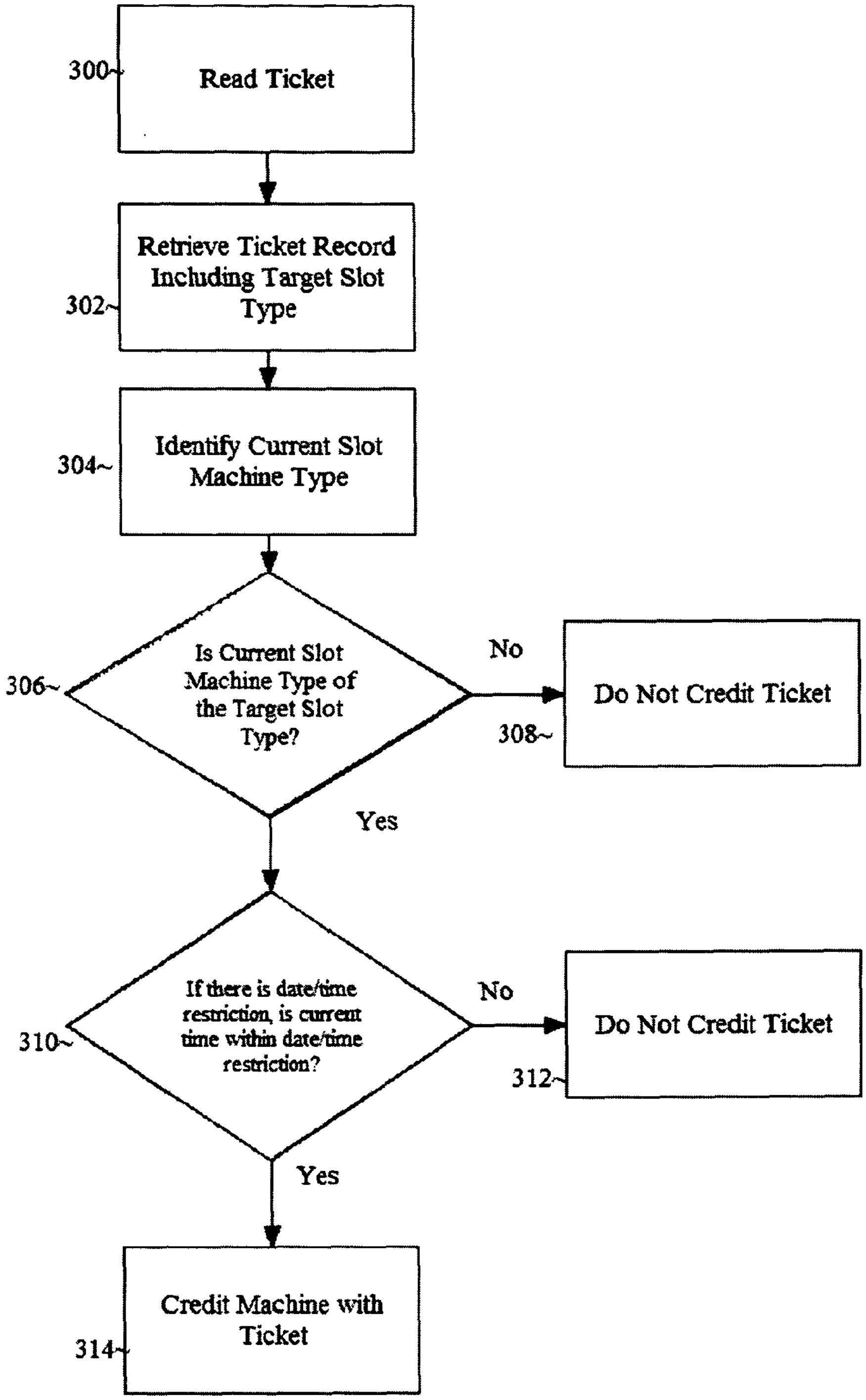
FIG. 3 is a flowchart illustrating a method of validating a targeted ticket, according to an embodiment of the present invention.

FIG. 3 is a flowchart illustrating a method of validating a targeted ticket, according to an embodiment of the present invention.

The method starts when a ticket is inserted into a slot machine, wherein operation 300 reads the barcode (or other method of identifying the ticket) on the ticket.

The method then proceeds to operation 302 which retrieves the ticket record including the targeted slot machines which the ticket can be used. What can be targeted in the record can comprise particular slot machines (including specific units of general models), types of machines (such as video poker or 5 reel), and/or particular denominations of machines. The record can also include a pointer or indicator to another record which identifies targeted types of machines. For example, the record can simply include a particular promotion code, upon which a record for that promotion code contains all the details including the particular targeted machine types.

The method then proceeds to operation 304, which identifies the current slot machine which the ticket is inserted into. This is done as described above, in which an identification unit on each slot machine is utilized. The identification unit can return the type of slot machine it is, or else a unique slot machine identification number which is then used to look up the type of machine in a database.

From operation 304, the method then proceeds to operation 306 which checks if the current slot machine type is compatible with the targeted type indicated in the ticket record. A machine database can be used which identifies particular machines and respective models to determine the current type of machine. The database can also store which particular machines will work with this particular ticket. If the type (or compatible machines) in the ticket record does not match the type identified in operation 304, then the answer is no and then the method proceeds to operation 308 which does not credit the ticket and should typically return the ticket to the player. Preferably, a message should be displayed to the player that the machine is not compatible with the ticket.

If the check in operation 306 determines that the current slot machine is compatible with the target slot machine(s) then the method proceeds to operation 310 which checks if there is a date/time restriction on the ticket and if so, if the current time is within the date/time restriction. If the answer is no, then the method proceeds to operation 312, which does not credit the ticket and should typically return the ticket to the player. Preferably, a message should be displayed to the player that the machine is not compatible with the ticket.

If the check in operation 310 is positive, then the method proceeds to operation 314, which accepts the ticket and processes the ticket normally which includes crediting the machine with the ticket amount. However, depending on the ticket type, the credit in the machine may or may not be cashed out normally. For example, some tickets or situations may produce another special ticket when cashing out.

One undesirable consequence of distributing promotional tickets is that a player may pass them on to friends if they decide not to use them themselves. However, the casino may wish to designate the tickets as non-transferable. For example, if the casino decides to target a ticket for video poker usage only to an intended player that the casino has determined is a poor video poker player, the casino would not wish this ticket to be transferred. There are many other reasons why a casino would not wish these tickets to be transferred. One way to discourage this practice is to require the player to use his or her loyalty club card when using the ticket. Thus, if someone wanted to use a ticket intended for someone else, the potential user would have to have that person's loyalty club card.

Optionally, a ticket can also have the intended person's name written on the face, i.e. "issued to: John Smith." Any of the figures illustrating tickets can also include such an indication and functionality (i.e. working when "John Smith's" loyalty club card is inserted, or upon cash in at the cashier "John Smith" must present ID). It is also optional that an automated ticket casher would reject a ticket intended for a particular person so that his or her ID can be checked by the cashier. This can be accomplished by located the respective ticket record and checking whether a flag is set to not allow automatic reimbursement.

Figure 4:
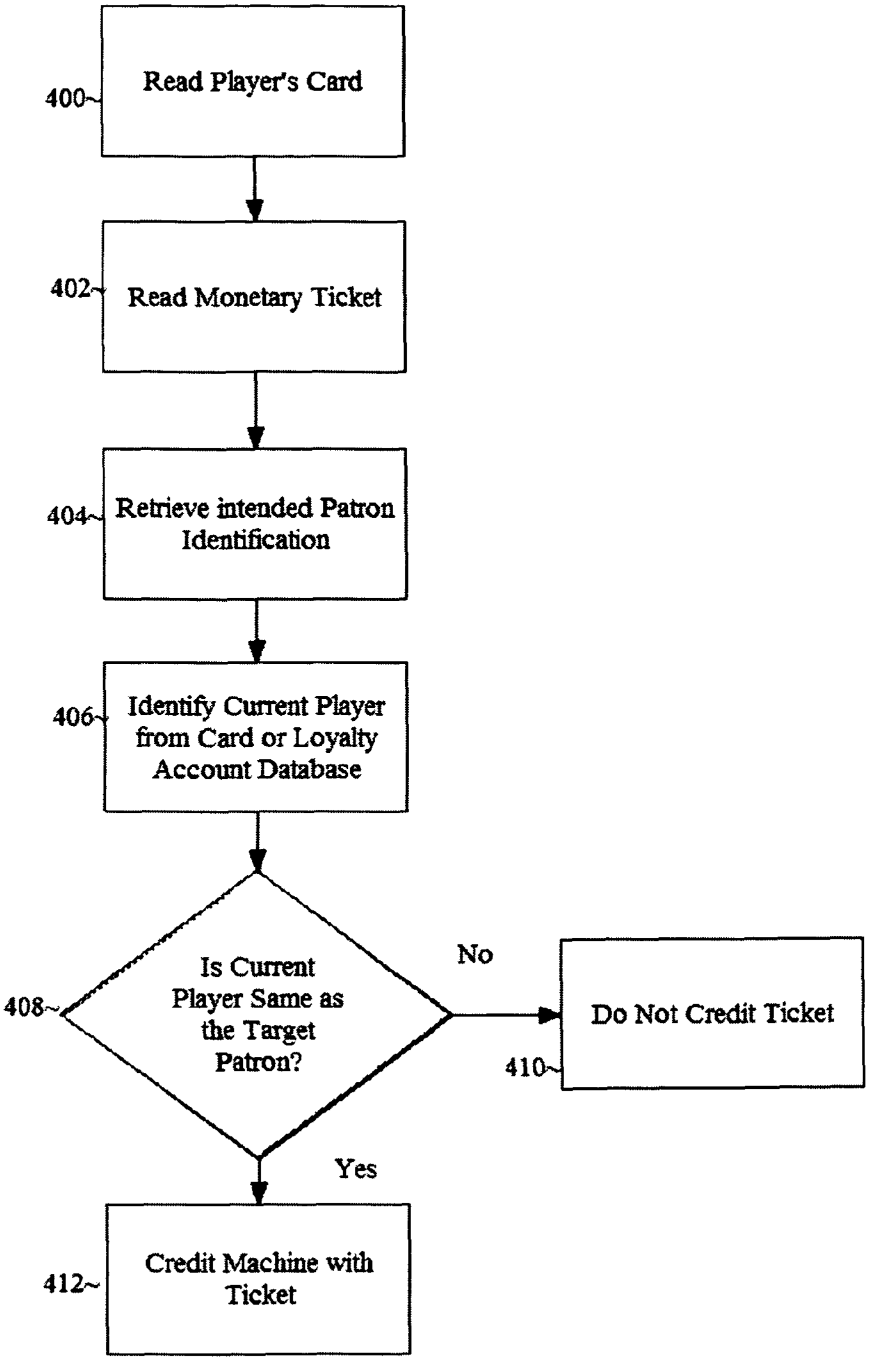
FIG. 4 is a flowchart illustrating a method of verifying a ticket with a patron, according to an embodiment of the present invention.

FIG. 4 is a flowchart illustrating a method of verifying a ticket with a patron, according to an embodiment of the present invention.

The method starts with operation 400, which reads a players loyalty card.

The method then proceeds to operation 402, which reads the ticket.

The method then proceeds to operation 404, which retrieves the intended patron identification. This can be done by locating the ticket record (from the scanned barcode on the ticket) and then retrieving a field in the ticket record which can contain an intended patron (preferably identified by the patron's loyalty club number).

The method then proceeds to operation 406 which identifies the patron associated with the loyalty card inserted. This is done by reading a magnetic identification code on the loyalty card and retrieving a record associated with the card which contains the owners slot club number. Alternatively, this number may be encoded directly on the magnetic stripe itself, upon which no lookup is required.

The method then proceeds to operation 408, which determines if the inserted slot club card owner is the same as the patron intended for on the ticket. If not, the method proceeds to operation 410 which does not credit the ticket and typically returns the ticket, although the casino may alternatively wish to keep the ticket for illegal usage.

If the method determines in operation 410 that the inserted slot club card owner is the same as the patron intended for on the ticket, then the method proceeds to operation 412 which credits the machine with the ticket (subject to possible restrictions as discussed herein).

An additional or alternative way to enforce the non-transferability of these tickets is to require a player to present ID (preferably with a photo) upon cashing a non-transferable ticket. An intended player's name can optionally be printed on the ticket so a cashier can easily verify the ticket has not been transferred, or the cashier can alternatively scan the ticket wherein the intended player's name can be automatically displayed.

One disadvantage of a targeted ticket is that the player may cash in the ticket on the targeted machine, then request a cashout on the machine, and then keep the money. Of course, the casino's intention in issuing the targeted ticket is that the player plays the machine instead of keeping the money.

Therefore, special tickets can also include special operations or restrictions to ensure play. For example, a special ticket can contain a playthrough requirement. This is a minimum amount that a player must wager using the funds contained on the ticket before the player can cash out (either any amount on the ticket or the original promotional amount on the ticket).

For example, a special ticket can be issued to a player with a $50 value intended for the Grizzly Bear Slot Machine, with a $500 playthrough requirement. Preferably, the player must make $500 in wagers on this particular machine type (although a targeted type is not required) using this ticket before the player can exchange the ticket for any cash. Alternatively, the player can be free to exchange the ticket for any cash amount above the original amount, but can only cash out the original amount when the player meets the playthrough requirement. In this manner, the player is forced to play the machine instead of being allowed to immediately cash out the ticket.

Another way the player can be forced to play with a special ticket is by providing a ticket with a cashable and a noncashable amount. Typically, such a ticket would be issued with a noncashable value and zero cashable value. When the player wins money above the initial noncashable value then the difference is considered the cashable value which can be cashed out, but the noncashable value typically cannot be cashed out.

For example, consider a ticket issued to a patron that initially has a $0 cashable value and a $100 non cashable value. The patron wins $200 by gambling with the initial $100 non cashable value. The patron can then cash out $200 from this ticket and the remaining $100 non cashable value is discarded. As another example, consider the same initial ticket but then the player loses $50. The ticket then has a $50 noncashable value and a $0 cashable value. The ticket has no cash value and the player would be wise to play with the ticket to try to win some money (anything above $100 in this case would become cashable). It is preferable (but not required) that a ticket with a noncashable amount be limited to use in certain denominational machines (as described herein). This is because a noncashable amount used as a large bet results in a larger effective value of the ticket then if wagered using small bet(s). For example, a noncashable $100 ticket played once in a $100 slot machine has an effective value close to $100, while the $100 ticket continuously played in a 0.25 slot machine will ultimately have a much smaller value.

FIG. 5A is an example of a targeted ticket, according to an embodiment of the present invention. The ticket in 5A contains the casino name, a designation that this is a promotional ticket, an indication that this is a targeted ticket with the target (i.e. a temporal range or slot machine type), a value, and a barcode (which encodes the ticket identification number which should also be written on the ticket but is not pictured).

FIG. 5B is an example of a targeted ticket with a playthrough requirement, according to an embodiment of the present invention. Note that the remaining play required for a cashout is indicated on the ticket.

FIG. 5C is an example of a standard ticket, according to an embodiment of the present invention.

Figure 6A:
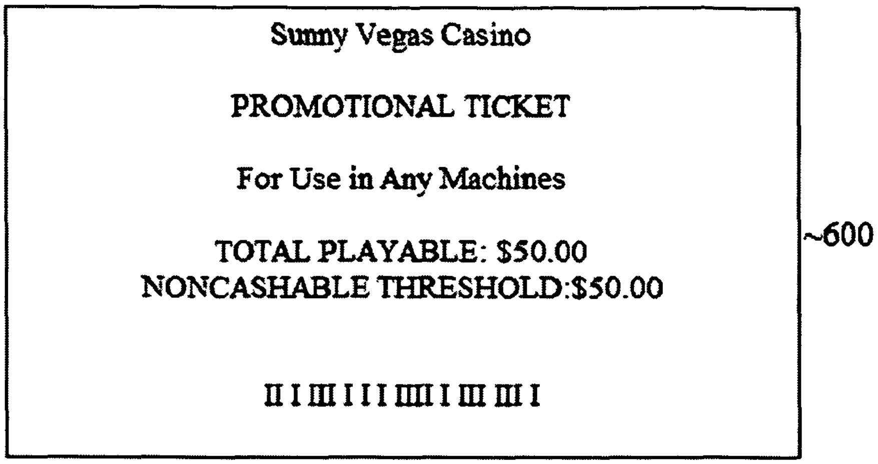
FIG. 6A is an example of a special ticket with a cashable and a noncashable portion, according to an embodiment of the present invention.

FIG. 6A is an example of a special ticket with a playable amount and a noncashable threshold. The playable amount typically represents how much will be credited into a machine when the ticket is inserted into a respective ticket reader. The noncashable threshold is typically fixed for the life of the ticket (and ticket out requests based on insertion of the ticket) and represents how much is needed before the ticket has an actual cash value that can be redeemed for cash. For example, the ticket illustrated in FIG. 6A has no current cash value. If a patron attempted to cash this ticket in, either the ticket would be returned to the player or the ticket would be kept by the machine (or cashier). This ticket has no redeemable cash value because the total playable is not greater than the noncashable threshold.

Figure 6B:
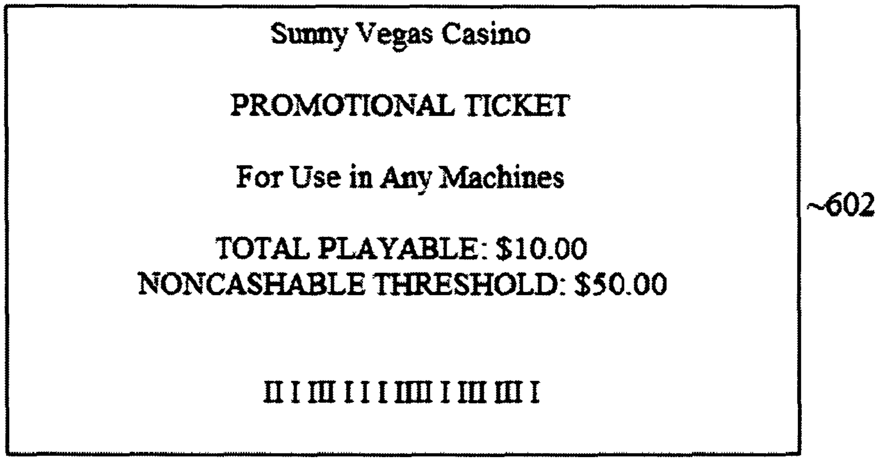
FIG. 6B is an example of a second special ticket with total playable and a noncashable threshold, according to an embodiment of the present invention.

FIG. 6B is an example of a second special ticket with total playable and a noncashable threshold, according to an embodiment of the present invention. This ticket could be generated after a player inserted the ticket in FIG. 6A into a machine, lost $40 of the noncashable money, then requested a ticket out operation (cash out). This ticket also has no redeemable cash value. When inserted into a machine, this ticket would typically generate $10 into the machine to play with.

Figure 6C:
FIG. 6C is an example of a third special ticket with a playable and a noncashable threshold, according to an embodiment of the present invention.

FIG. 6C is an example of a third special ticket with a playable and a noncashable threshold, according to an embodiment of the present invention. Note this Ticket can be redeemed for $50 cash. This is the total playable minus the noncashable threshold. This ticket could have been generated after a player inserted the ticket in FIG. 6A into a slot machine, won $50, then requested a ticket out operation (cashout). If a player cashes this ticket out, the player will receive $50 cash for the entire ticket.

A simple way to determine a redeemable value of these tickets is to subtract the noncashable threshold from the total playable amount. If this result is 0 or a negative number, the ticket has no redeemable cash value and should be returned to the player if an attempt is made to redeem it for cash (either by an automatic ticket redeemer or a cashier). Otherwise, cash can be dispensed equal to this value. When a player requests a ticket out from a slot machine, updated values of these parameters should be computed. The amount of credits currently on the machine should typically be the total playable amount, while the noncashable threshold stays fixed (and is stored either locally on the slot machine and/or on the respective ticket record).

When such a promotional ticket is subject to a ticket out request, the host checks a respective machine record to determine the machines' mode (normal or promotional (and what kind of promotional mode)) and if a promotional ticket of the same type is to be generated upon a ticket out request (this can be determined from promotional rules related to the particular promotional mode), then a similar promotional ticket is generated upon cashout. Thus, a player cannot insert a ticket with conditions attached, make a ticket out request to receive a normal ticket.

Note that alternative notation can be used to designate the parameters of these tickets, for example the ticket in FIG. 6C could have written on it, "total playable value: $100; cashable: $50, noncashable: $50." This tells the player that the ticket has a total playable amount of $100, $50 of this can be redeemed; and the ticket has a fixed noncashable (threshold) feature of $50; Using these three values (instead of two), the ticket in FIG. 6A could read, "total playable value: $50; cashable: $0; noncashable: 50." Alternative wording, values, etc., can be used on the ticket to describe to the player parameters/conditions attached to the ticket.

Note that each ticket generated in sequence like this would typically be freshly generated with new ID's and records. Alternatively, in a less preferred embodiment, the same ticket ID and record can be used while updating the information in the record.

With the ticket described above (or any kind of ticket described herein), the denomination of a machine the ticket is used in can be restricted (using the targeted methods described herein). If a machine is a multi denominational machine, then only particular denomination(s) may be active with a promotional ticket (depending on the promotion rules). Thus, a ticket may be only targeted for 0.25 use, but not $1 or higher use. This may reduce the expected value of the ticket by preventing a player from betting the entire playable amount of the ticket at once.

In yet a further embodiment of the present invention, a ticket can contain a cashable/noncashable portion. When the player plays with funds from the ticket, the noncashable portion is deducted first, while wins are credited to the cashable portion. When the player has bet the entire noncashable portion, the ticket has a 100% cashable value, upon a ticket out request would generate a standard ticket. If the player has not yet bet the entire noncashable portion, then a ticket out request would generate a ticket with both current values. Either/both of the values can also be displayed directly on the slot machine or an output device associated with the slot machine (such as a ticket reader) for the player's convenience.

Figure 7:
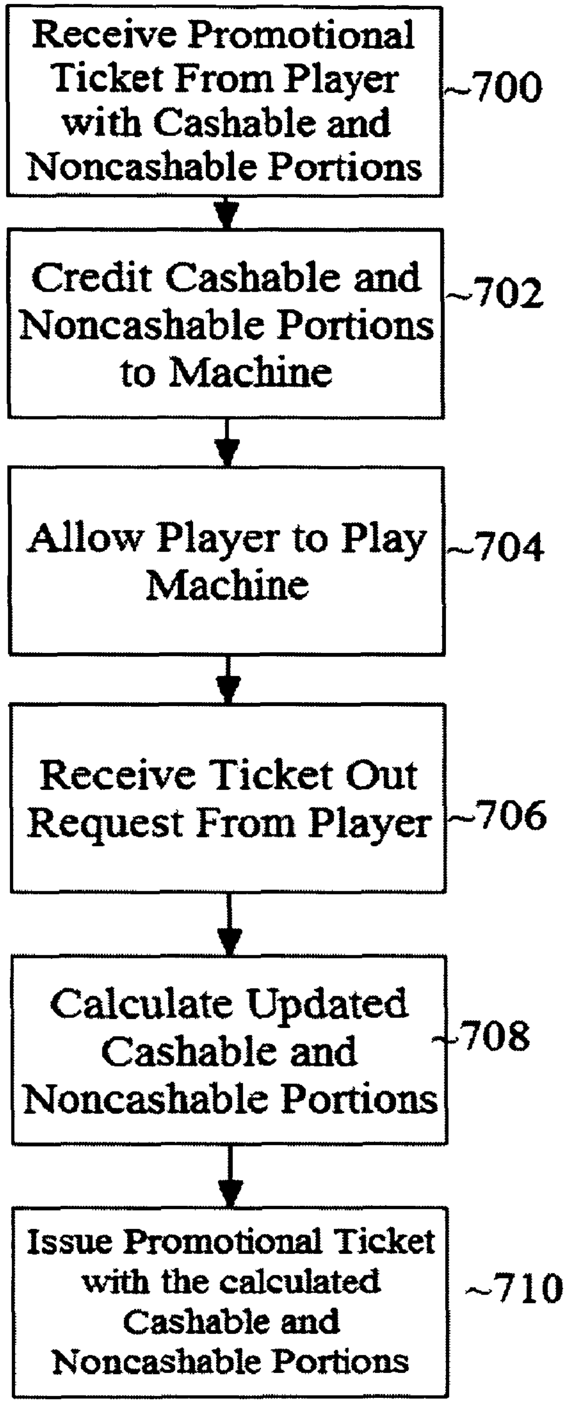
FIG. 7 is a flowchart illustrating a method of using a ticket with a cashable and noncashable portion, according to an embodiment of the present invention.

FIG. 7 is a flowchart illustrating a method of using a ticket with a cashable and noncashable portion, according to an embodiment of the present invention.

The method starts with operation 700 in which a machine game receives a promotional ticket from player with a cashable and noncashable portion. The ticket is scanned and the respective record is identified, upon which the cashable and noncashable amounts are retrieved.

From operation 700, the method proceeds to operation 702 which credits both the cashable and noncashable portions to the machine. Thus, if the ticket record (which should match what is printed on the ticket face) designates $50 cashable and $100 noncashable, then the machine will be credited for $150.

From operation 702, the method proceeds to operation 704, which allows the player to play the machine normal with the credited credits. If the player loses all of the credits, then the promotional play period is over and the machine resets to a normal mode waiting for a new player to insert a ticket or cash.

From operation 704, the method proceeds to operation 706 which receives a ticket out request from the player. At this point the player is finished playing and wishes to receive a ticket so that the player can leave the machine.

From operation 706, the method proceeds to operation 708 which calculates updated cashable and noncashable portions. If the total amount of credits is greater than the noncashable portion, then the excess is considered the cashable portion. If the total amount of credits is less than the noncashable portion, then the noncashable portion equals this total amount and the cashable amount should typically be zero.

From operation 708, the method proceeds to operation 710 which then issues a new ticket with the calculated cashable and noncashable amounts. Typically, a new ticket record is also created with the updated cashable and noncashable amounts. The cashable and noncashable amounts should typically be printed on the face of the ticket as the previous promotional ticket had. The proper fields in the respective ticket record are written to reflect that this new ticket is also a promotional ticket with the playthrough requirement.

It is noted that when a promotional ticket is inserted into a machine with a cashable/noncashable portion, a playthrough requirement, or any other restriction on cashout, then the machine should ideally not accept additional cash or ticket deposits during a promotional play period. This is to avoid confusion by the player of adding liquid cash to a promotional amount of money. In the alternative, cash or tickets can still be accepted while a player is playing with promotional funds, and the current amount of credits can be adjusted according to the deposit amount. For example, if a player is using a ticket with a $100 noncashable/$50 cashable amount, and the player deposits $20 cash, the situation can be adjusted to now reflect $100 noncashable/$70 cashable, which can be reflected upon a ticket out request. If the player is playing from a ticket with $100 amount with a playthrough requirement, and the player deposits a $20 bill (or standard $20 ticket) then the new situation would reflect a $20 liquid cash amount and the former $100 with the playthrough requirement, which can both be issued on the same ticket. In order to simplify these issues for players, it is recommended that no additional deposits be taken while a promotional ticket is in use.

Figure 8:
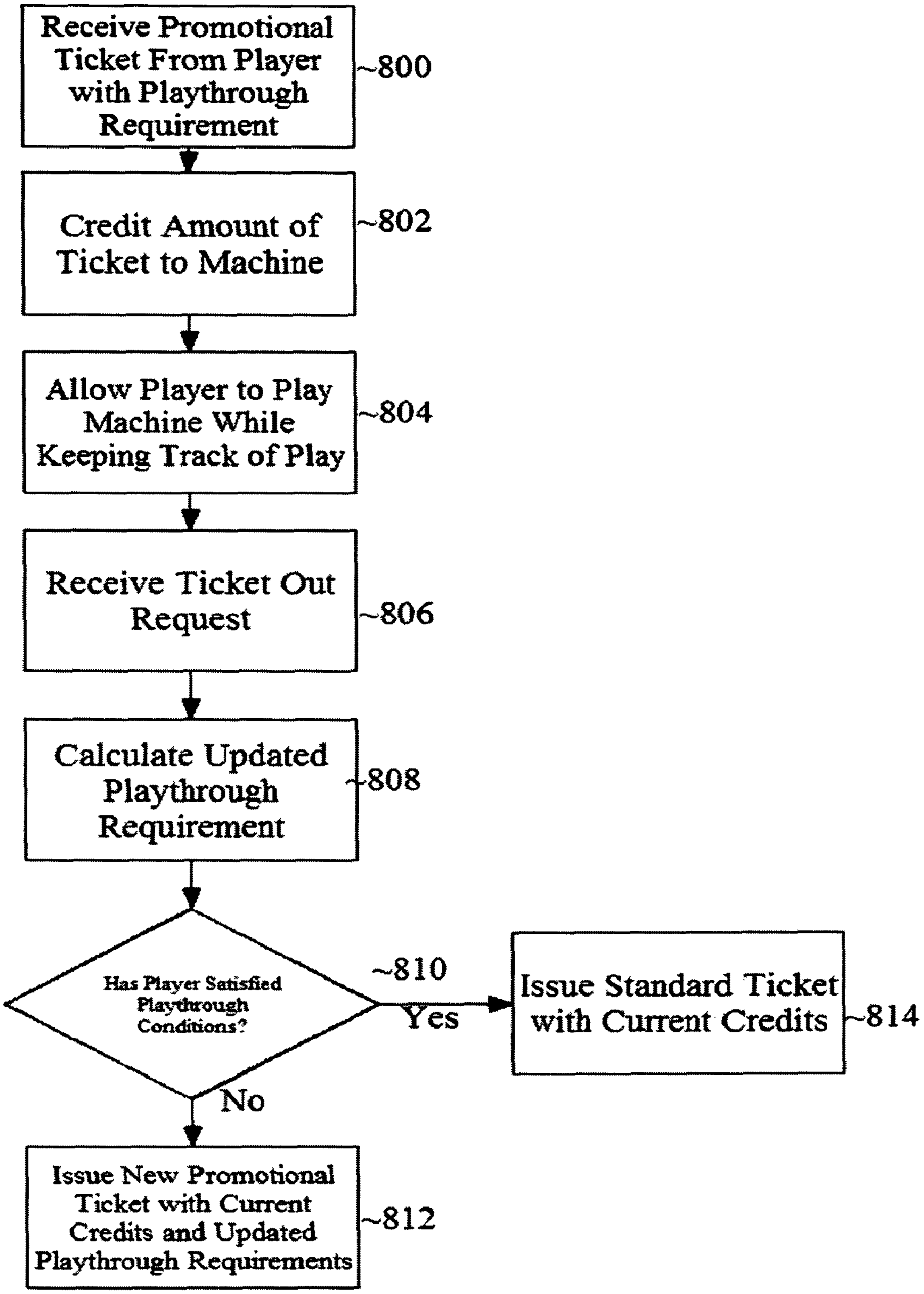
FIG. 8 is a flowchart illustrated a method of using a ticket with a playthrough requirement, according to an embodiment of the present invention.

FIG. 8 is a flowchart illustrated a method of using a ticket with a playthrough requirement, according to an embodiment of the present invention.

The method starts with operation 800 which receives a promotional ticket from a player with a playthrough requirement. After the ticket is scanned by the ticket reader and the respective ticket record is located, then the details of the ticket including the playthrough requirement are retrieved.

From operation 800, the method proceeds to operation 802 which credits the amount of the ticket to the machine.

From operation 802, the method proceeds to operation 804 which allows the player to play the machine while keeping track of play. Each spin or dollar amount bet can be recorded or added to a stored sum in the ticket record. Thus upon each play, the machine can transmit the amount played to the host which records the play so the player is credited with the play. Alternatively, the player's play towards the playthrough requirements can also be recorded locally (either on the machine or the ticket reader) and transmitted to the host for recordation upon a ticket out request.

From operation 804, the method proceeds to operation 806 which receives a ticket out request from the player.

From operation 806, the method proceeds to operation 808 which calculates the updated playthrough requirement. The total amount of dollars bet (or number of spins) is subtracted from the previous playthrough requirement upon inserting the ticket.

From operation 808, the method proceeds to operation 810 which checks whether the player has satisfied the playthrough conditions. If the total amount of dollars bet (or number of spins) subtracted from the previous playthrough requirement is zero or less, then the player has met the playthrough requirements. In the alternative, each dollar amount bet (or spin) can be accumulated (instead of subtracted) and if the total of play equals or exceeds the requirements then the player is considered to have met the requirements. For example, a ticket can state, "$1000 in play required/current play: $700" in which the player sees he or she needs to wager $300 more to meet the requirements. However, the subtraction method is preferred as it is more intuitive for players (i.e. "$300 left to wager before cashout")

If the check in operation 810 determines that the player has not met the requirements, then the method proceeds to operation 812 which issues a new promotional ticket with the current amount of credits from the machine and updated playthrough requirements. The ticket record is adjusted to reflect the newly calculated playthrough requirements (i.e. previous playthrough requirements minus the play from the recent session) and a new promotional ticket is printed which reflects the new figures. This new ticket is also subject to the playthrough requirements before cashing out. The proper fields in the respective ticket record are written to reflect that this new ticket is also a promotional ticket with the playthrough requirement. The player is then of course free to insert this newly issued ticket into machines to continue play and hopefully meet the playthrough requirements so that the player can cash the ticket in for real money.

If the check in operation 810 determines that the player has met the requirements, then the method proceeds to operation 814 which issues a standard ticket with the current amount of credits.

This ticket can be used as any standard ticket and can be cashed out for full (or limited) face value. Alternatively, since this ticket (or any other derived from any kind of promotional ticket) was derived from a promotional ticket, a special cash-out procedure may optionally be required for this ticket (by setting a special flag in the ticket record) such as presenting a valid photo ID to a cashier to enforce the non-transferability of the original promotional ticket. A cashier may have access to the owner of this ticket (from the record) to verify the player's identity before issuing the funds. Thus, optionally, a ticket derived from a promotional ticket may be disabled from being cashed in an automatic ticket casher machine. Or alternatively, no such procedures may be required upon cashout of such a ticket.

In yet a further embodiment of the present invention, a ticket can invoke special privileges for the player on a machine. For example, a ticket can invoke a special paytable for any machine (such as a slot machine or video poker, etc.) This special paytable can be utilized by the player for either a fixed duration of time (i.e. one hour), a predetermined amount of play (i.e. number of spins/bets or amount bet), for an entire playing session, indefinitely (i.e. when the ticket is cashed out a new ticket with the same requirements is issued), until the player loses all the funds on the ticket (or cashes them out), or any other limiting factor. For example, such a ticket can invoke a slot machine in which certain payouts pay more (i.e. 777 pays double).

As applied to video poker, Table I below represents one example of a standard paytable for video poker.

TABLE I

| | |
|---|---|
| ROYAL FLUSH | 4000 |
| STRAIGHT FLUSH | 250 |
| FOUR OF A KIND | 125 |
| FULL HOUSE | 30 |
| FLUSH | 25 |
| STRAIGHT | 20 |
| THREE OF A KIND | 15 |
| TWO PAIR | 10 |
| JACKS OR BETTER | 5 |

A promotional ticket can invoke a special paytable for a player. For example, royal flushes can pay double (or any other multiple). Or any replacement paytable can be used with any chosen payouts.

In a preferred embodiment, the "special paytable ticket" when inserted into a machine invokes the special paytable. If the player loses all of the funds, then the promotional mode is over and the machine returns to the machine's standard paytable. If the player requests a cashout, then the machine can issue another special paytable ticket for the current amount of credits. In this way, the player can continue to use this ticket and special paytable until he desires to cash in or lost all of the funds on the ticket.

Casinos maintain detailed databases of players and their playing habits. A casino may wish to issue such a special paytable ticket for video poker to a particular player who meets certain predefined criteria. For example, a casino can identify a bad video poker player by one who does not adhere to proper strategy. A video poker machine can compare a player's playing strategy with optimal strategy to determine the player's skill level. A casino may wish to send a bad video poker player a promotional ticket for $100 (or any amount) with a special paytable (such as four of a kinds pay higher and/or royal flushes pay double, etc.). While the casino loses an edge by providing a better paytable (the player optimal return on the modified paytable may even be 100% or greater (or it may be less) since this is a promotion), the casino should more than make up for it by enticing the bad player to return to the casino. In addition, the bad player does not play at a good return anyway, which offsets the higher paytable. Of course, marketing such a promotional ticket with a higher paytable is not just limited to bad players, but other factors could be used as well, such as time played, money wagered, etc.

Figure 9A:
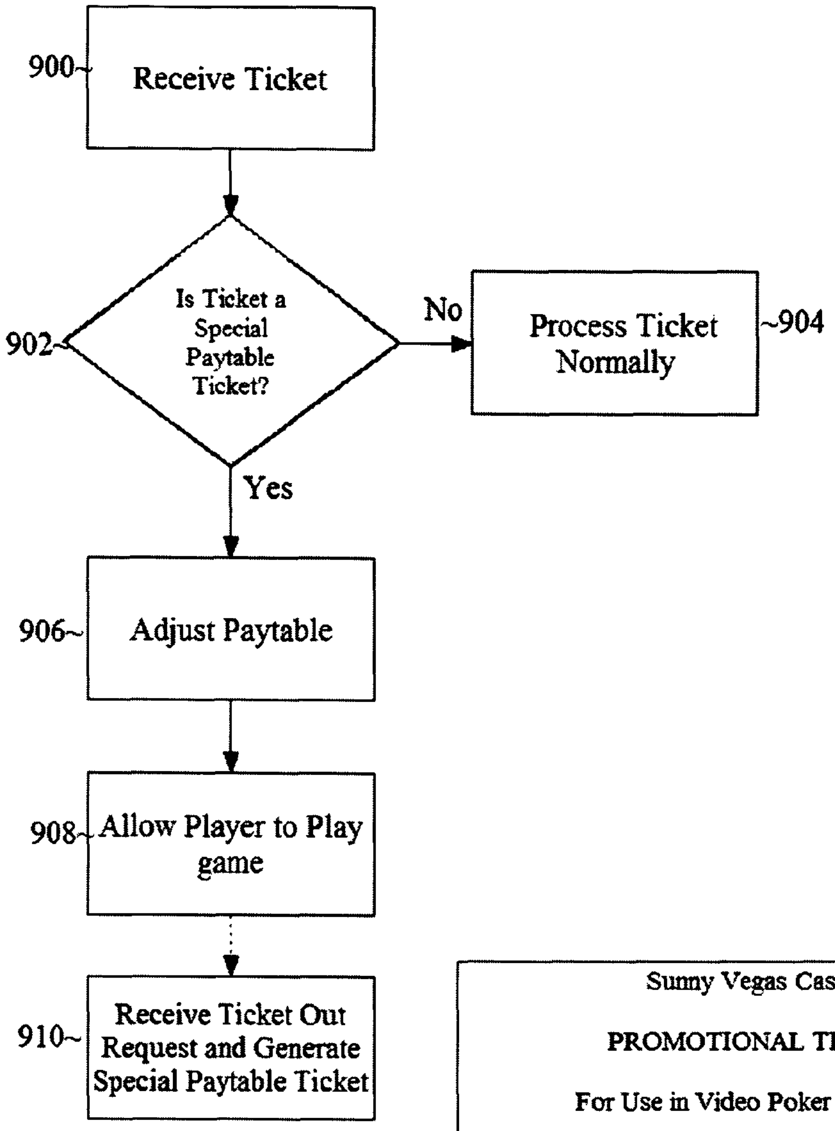
FIG. 9A is a flowchart illustrating a method of implementing a special paytable ticket, according to an embodiment of the present invention.

FIG. 9A is a flowchart illustrating a method of implementing a special paytable ticket, according to an embodiment of the present invention.

The method starts with operation 900, which receives the ticket by a slot machine in the standard manner.

The method then proceeds to operation 902, which checks to see if the ticket is a special paytable ticket. This can be done by locating the record associated with the ticket and checking the appropriate field(s) to see if this is a special paytable ticket.

If the check in operation 902 determines that this is not a special paytable ticket, then the method proceeds to operation 904 which processes the ticket normal (which may include checking for/handling other types of promotional tickets).

If the check in operation 902 determines that this is a special paytable ticket, then the method proceeds to operation 906 which adjusts the paytable to the paytable designated by the ticket. The paytable is found from look in the respective ticket record. The record can either store the actual modified paytable itself, or a pointer to another record which stores the modified paytable to be used. The modified paytable is of course displayed.

From operation 906, the method proceeds to operation 908 which allows the player to play the game. In one embodiment, the player can play as long as the player wishes in the modified paytable mode. Alternatively, the modified paytable mode can last as for limited time duration, a limited number of plays/spins/amount wagered, or any other limiting factor.

It is recommended that the player be allowed to play the modified paytable mode as long as the player wishes as long as there is money remaining from the original modified paytable ticket. Optionally, the player can be allowed to make a ticket out request and receive a new ticket which is also a special paytable ticket for the amount of credits on the machine. Thus, in this embodiment, the method can proceed to operation 910 which processes the ticket out request and generates a new special paytable ticket. The new ticket record associated with the new ticket has the field(s) used to designate a special paytable field reflected accordingly. Alternatively, the special paytable mode can be set to last only for one session, and upon a ticket out request a standard ticket is generated.

Figure 9B:
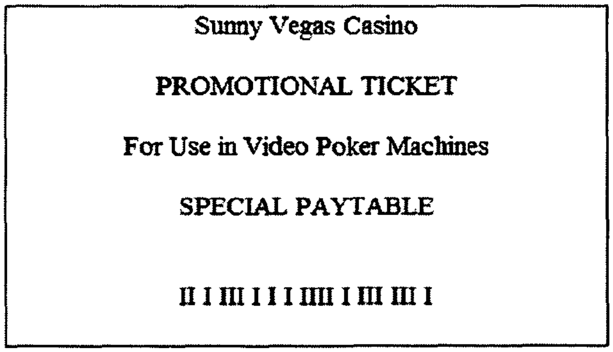
FIG. 9B illustrates an example of a special paytable ticket, according to an embodiment of the present invention.

FIG. 9B illustrates an example of a special paytable ticket, according to an embodiment of the present invention.

This promotional ticket indicates on the face that it is a special paytable ticket. Optionally, the ticket can also indicate on the face the actual special paytable, i.e. 5/10/15/20/30/50/150/250/5000 or "double royal flushes" or "double 777's." (for a slot machine).

A special paytable ticket (or special mode ticket) can be especially useful for special promotions offered by a casino. For example, some casinos offer a "four to a royal night" in which when a player receives a four to a royal hand the player gets paid. However, previously, the player with four to a royal must call an attendant to get paid, as this hand is not typically paid on a standard paytable. By way of the present invention, all players invited to join in the four to a royal night can simply get a special paytable ticket which invokes a paytable which includes paying a four to a royal hand. The ticket can include a time limitation (i.e. until midnight that night, or a 2 hour play time, or a given # of hands, or any temporal range or limiting factor). In this way, the four to a royal night can be entirely automated, and no manual attendants are required to pay out special hands.

Special tickets can be mailed to players as a promotion/incentive based on a record of each player's play. The decision to send a special ticket can be made automatically or manually. Factors that can go into the determination can include amount of play (and on which machines), skill of player, money won/lost, time played, etc. For example, a casino may wish to reward a slot player who has logged a lot of play time with a special ticket (of any of the types described herein including combinations of types and features). Special tickets can further be issued to match an appropriate player. For example, a video poker player that has played a predetermined amount of video poker (typically measured as the amount of action) may be sent a special ticket involving video poker, for example a "four to a royal ticket.

Figure 10:
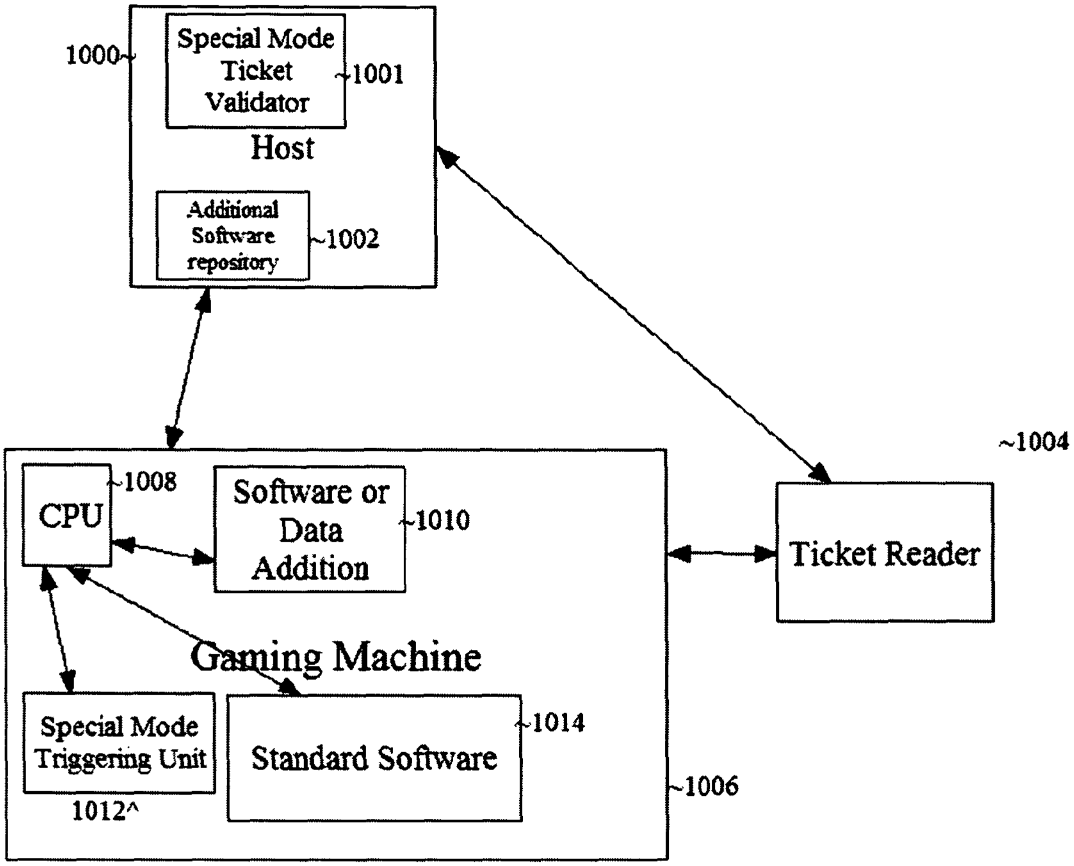
FIG. 10 is a block diagram illustrating an example of hardware used to implement a special mode, according to an embodiment of the present invention.

FIG. 10 is a block diagram illustrating an example of hardware used to implement a special mode, according to an embodiment of the present invention. Note that arrows pointing to a block also may include connections to all components inside the block. Further, all components inside a block may have arrows or communications with each other which may not be pictured. Further, additional known components may be left out of the diagram for simplicity, such as an output device, input device, etc. One example of a special mode would be a video poker machine with a special paytable or special rules (i.e. royal flushes pay double), but FIG. 10 is not limited to a video poker machine.

A host 1000 controls ticket in/ticket out transactions. A ticket reader 1004 associated with a gaming machine 1006 reads a ticket and transmits ticket information to the host 1000 which processes and validates the ticket, as described herein and known in the prior art.

A special mode ticket validator 1001 checks a respective record associated with the ticket and checks to see if a flag or field in the record indicates this is a special mode ticket which should invoke a special feature on the gaming machine. If not, then processing proceeds normally. If this is a special mode ticket, then a signal that this is a special mode ticket is sent to the gaming machine 1006.

The gaming machine 1006 has standard software 1014 to implement whatever game the machine plays (i.e. video poker). However, if a special mode is invoked, the gaming machine 1006 should also have a software or data addition 1010 to implement the special mode. The latter can be a software update which shows the gaming machine 1006 how to handle the extra features of the special mode (i.e. identify four to a royal hands and what to pay them). The software or data addition 1010 can also just be a data file of a new paytable. The software or data addition 1010 can also be a complete replacement software which runs instead of the standard software 1014 during a special mode.

The gaming machine 1006 may already have the software or data addition 1010 required. This could be built into the gaming machine itself, loaded separately, or loaded automatically. If the gaming machine 1006 does not possess the software or data addition 1010, then the host 1000 can automatically transmit the software or data addition 1010 to the gaming machine 1006 from an additional software repository 1002.

A special mode triggering unit 1012 is used to trigger the special mode which utilizes the software or data addition 1010. This is typically triggered by receiving a signal (directly or indirectly) from the host 1000 after the special ticket validator 1001 determines that this is a special mode ticket.

The CPU 1008 interfaces with the various components illustrated in order to implement the game operations.

An example of how the hardware illustrated in FIG. 10 operates is as follows. A patron is in possession of a special ticket for a four to a royal hand pays $100. The patron inserts the ticket into the ticket reader 1004.

The ticket reader 1004 scans the barcode on the ticket and transmits identifying information to the host 1000. The host 1000 checks the respective record for the ticket and the special mode ticket validator 1001 is used to identify that this is a special mode ticket from the appropriate record fields and the particular special mode of the ticket ("four to a royal mode.")

The fact that the gaming machine (a video poker machine in this example) 1006 is going to run in four to a royal mode (or any other special mode) is transmitted to the gaming machine 1006 from the host 1000. The host 1000 may perform a check to see of the particular gaming machine 1006 associated with the ticket reader 1004 is capable of playing in this special mode (either by querying the machine itself or a gaming machine database.) If not, the ticket may be rejected and returned to the player.

If the gaming machine 1006 is capable if running in the special mode, then the special mode triggering unit 1012 invokes the software or data addition 1010 in order that the special mode be utilized. In this case, the software or data addition 1010 can comprise a "plug in" or addition to the standard software 1014 which teaches the gaming machine 1006 how to recognize and pay out a four to a royal hand. Alternatively, the software or data addition 1010 can just be a simple modified paytable used by the standard software 1014. The respective ticket record may contain information on the special paytable to be used or special software needed to implement the paytable, for example in the promotion information field.

The end of the special mode can be determined by the host 1000 and may depend on conditions associated with the ticket (and the respective ticket record). For example, if a time period for the special mode has expired, then a signal can be sent from the host 1000 to the gaming machine 1006 (or more particular the special mode triggering unit 1012) which terminates the special mode and returns the gaming machine 1006 back into a normal mode. Of course any credits accumulated by the player while the special mode is in operation remain credited in the machine so that the player can cash out.

The host 1000 (and also the gaming machine) may maintain an indicator of a mode the gaming machine 1006 is in (i.e. normal or special mode and which particular one). It is also noted that any of the incentives or promotional features described herein may be considered a "special mode" and special software or handling can be used to implement or assist in such promotions (as described in FIG. 10, and any other Figure as well). For example, when a ticket requiring a playthrough requirement is used, an additional software routine can be invoked to display the remaining playthrough requirement on the output device on the gaming machine itself.

Alternatively, the remaining playthrough requirement (or any other relevant information regarding a ticket, such as time left or spins left for a special mode, etc.) may be displayed on the ticket reader itself. The signal describing the remaining playthrough requirement can be received from the host itself (or such things can be tracked locally). The ticket reader may also display any other information related to any of the promotions described herein.

In yet an additional embodiment of the present invention, a patron can insert a standard monetary ticket (or cash) into a gaming machine, and depending on predetermined conditions (which can include a random determination) a special ticket can be generated upon a ticket out request. For example, consider a player that inserts a $100 bill into a video poker machine. The player wins $500 and requests a ticket out for $600. The casino may prefer that the player gamble some more with that ticket as opposed to redeeming it for cash. Thus, the host may trigger a special ticket (as described above), along with a special message displayed to the player, that the player is receiving a ticket out worth $600 with a special advantage attached to it (such as royals pay 5000 coins). In this way, the player may be motivated to continue gambling with this ticket as opposed to cashing it in. The special ticket may only work in certain machines, otherwise the ticket may be returned or play would just continue as normal.

The conditions for receiving a special ticket from a normal cash-in can be determined by the casino and can depend on many factors, such as the skill of the player, amount the player has won or lost, a random determination, etc. If these conditions are not met, then the player receives a standard ticket upon his or her request.

In some cases, it may be desirable or even necessary to keep track of which machines may be playing in a promotional mode. This is because in some promotional modes, cashing out a ticket would generate another promotional ticket (as described above). Therefore, the host which authenticates and approves ticket requests may need to keep track of machines and their respective statuses so that it knows how to handle ticket requests.

Figure 11:
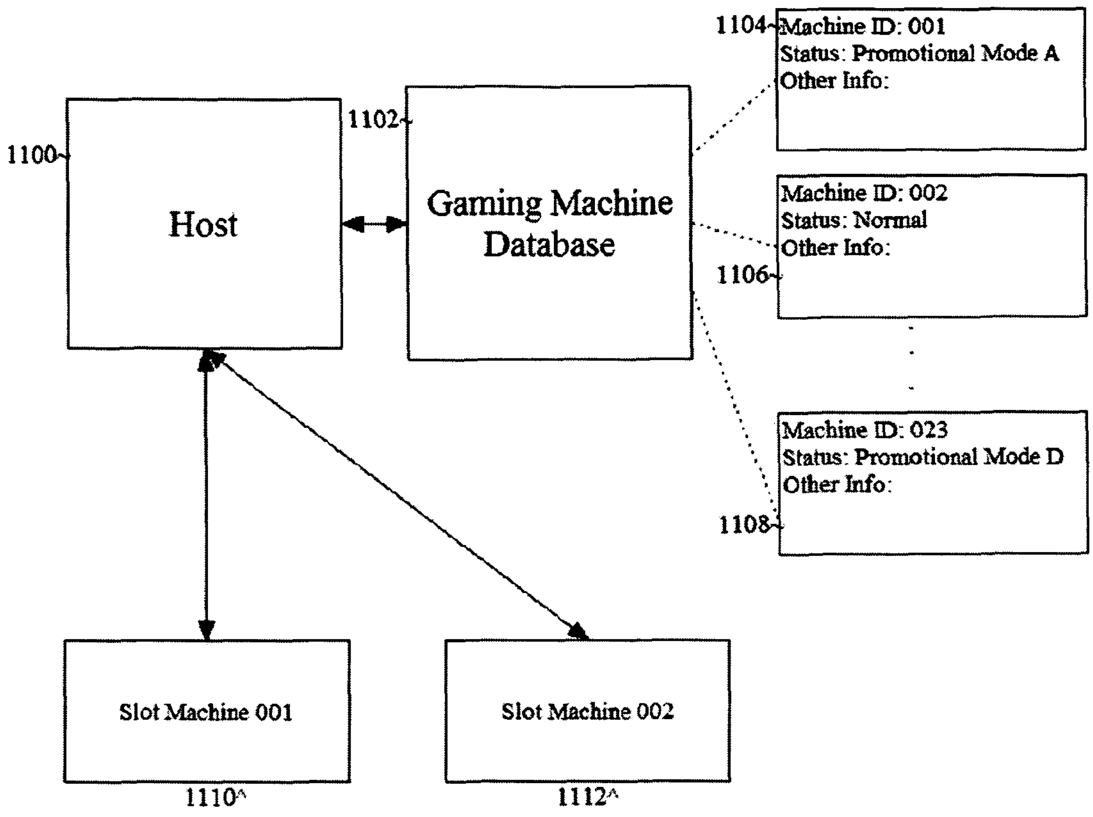
FIG. 11 is a block diagram illustrating hardware used to identify machines and their modes, according to an embodiment of the present invention.

FIG. 11 is a block diagram illustrating hardware used to identify machines and their modes, according to an embodiment of the present invention.

A host 1100 is used to control ticket in/out request and other machine operations. Of course, more than one host may be utilized for this (or any operations described herein), but for simplicity one host is illustrated.

The host 1100 is connected to a gaming machine database 1102. The gaming machine database 1102 stores a record for each respective gaming machine. Records 1104, 1106, 1108 are used to store information for each machine. Each record can store a machine identification (and the records are preferably indexed by identification number), a status, and any other information that the host 1100 may want to keep track of. The status indicates whether the machine is running in a normal mode (upon which ticket out requests are processed normally), or running in a special or promotional mode, and which one.

If the machine is running in a promotional mode, that promotional mode is identified by an identifier in a field. A special software routine (which can be pointed to in the record or a table which identifies promotional modes and respective special software to run) may be executed upon certain actions (such as a ticket in request, a ticket out request, etc.) Thus, when a machine is running in a promotional mode of which the rules dictate that a promotional ticket will be generated upon a ticket out request, the host upon receiving such a request, identifies from the respective record that the particular machine is running in a promotional mode. Then it invokes software for special handling of the ticket out request, which would generate another promotional ticket instead of a standard one. Promotional tickets are generated by a standard method, but additionally indicating in the ticket record that this is a promotional ticket along with special fields/values identifying the promotion and parameters therein.

The gaming machine itself may also keep track locally of whether or not it is in a promotional mode as well. Alternatively, no gaming machine database 112 need be used to track promotion modes as this can also be kept just locally (and also transmitted to the host if requested). However, the gaming machine database 112 is recommended for security reasons. If cash is inserted into a machine during a promotional play, the cash may be accepted (with data adjusted appropriately) or rejected, depending on the promotional mode and preferences of the designers.

In yet a further embodiment of the present invention, a special promotion ticket can be created with a random value. When the ticket is inserted, a value for the ticket is chosen and credited to the machine. Alternatively, the value of the ticket could be pre-selected but hidden from the player. Thus, such a ticket can be for example mailed to a player with a message stating that the ticket can have a value from $20-$1000, or it can have discrete possible values such as: $20, $50, $100, $500, $1000. The respective ticket record indicates this type of special ticket and how it is to be processed (i.e. a routine that will generate random numbers). An expiration date (or date range) can be also be used.

Another method the above can be accomplished is to just use a standard ticket, but without the value displayed on the face. Thus, the player will have to use it on a machine (and hopefully cause the player to visit the casino) to see the value.

In yet a further embodiment of the present invention, a cash rejection mechanism is utilized which can optionally reject cash deposits in a slot machine during a promotion. This may be desirable when it might be confusing for patrons to make cash deposits when playing during a promotional mode.

Figure 12:
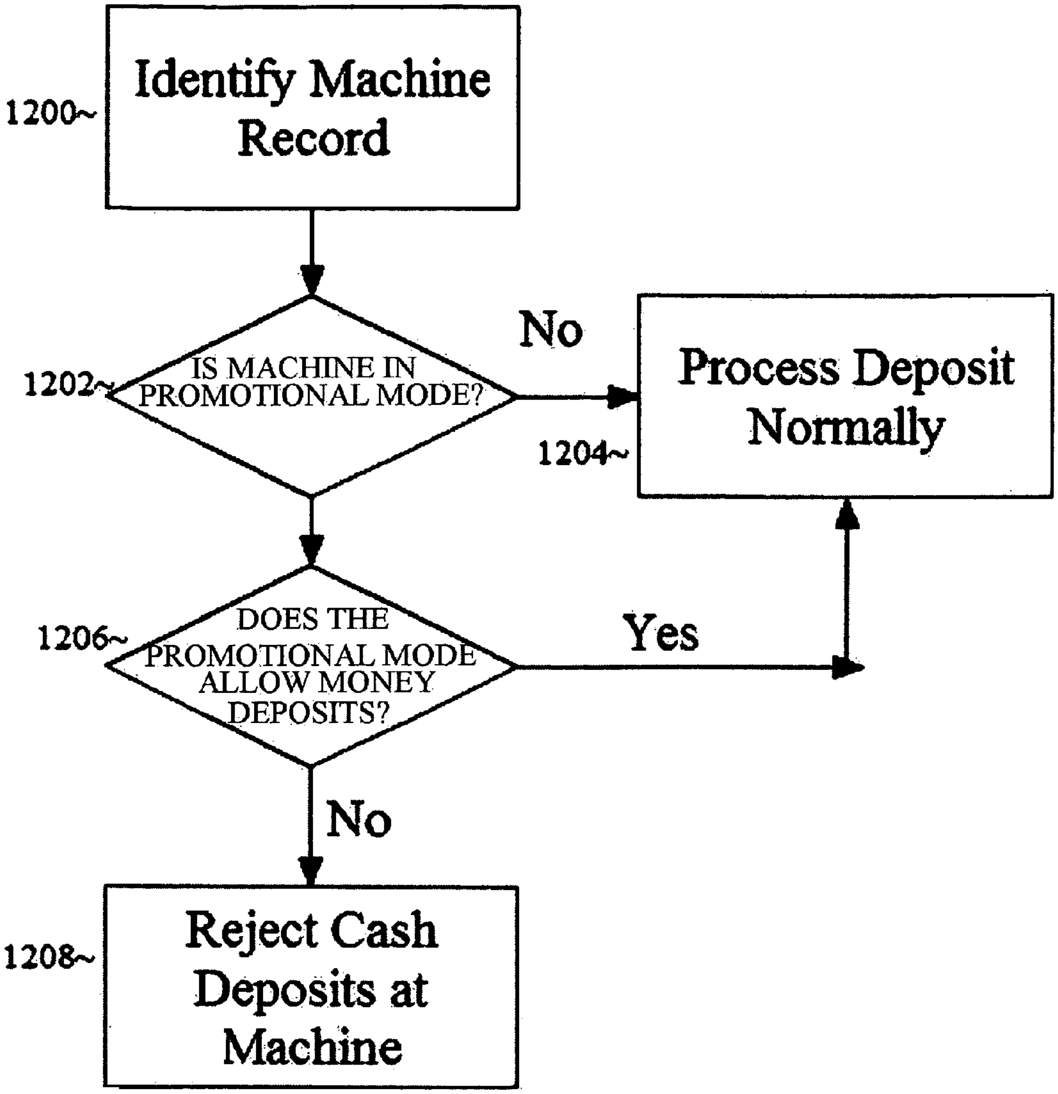
FIG. 12 is a flowchart illustrating a method for cash rejection mechanism, according to an embodiment of the present invention.

FIG. 12 is a flowchart illustrating a method for cash rejection mechanism, according to an embodiment of the present invention.

The method starts with operation 1200, which identifies a machine record. A machine record is stored in a gaming database (such as the records 1104 1106 1108 stored in the gaming machine database 1102 from FIG. 11).

From operation 1200, the method proceeds to operation 1202 which checks to see if the machine is in a promotional mode. This can be done by checking the relevant machine record retrieved in operation 1200, and the relevant field within the record. If the machine is not in a promotional mode, then the method proceeds to operation 1204 which processes a cash deposit normally.

If the check in operation 1202 determines that the machine is in a promotional mode, then the method proceeds to operation 1204 which determines whether the particular promotional mode allows cash deposits. This can be determined from a field in the machine record. Alternatively, a database can be kept of promotional modes and their parameters, such as whether cash deposits are allowed. This database can be accessed with the current promotional mode to see of a cash deposit is allowed. Alternatively, instead of operations 1200 and 1206, the machine record can directly store whether a cash deposit is allowed. Alternatively, the slot machine itself can store locally whether a cash deposit is allowed.

If the check in operation 1206 (or other way of checking as described above) determines that a money (or cash) deposit is not allowed, then a cash deposit (or further ticket) is rejected when inserted into a machine. Typically, the cash or ticket or other instrument inserted is returned to the player with an optional message to the player that deposits are not allowed during a promotional play.

When a promotional ticket is to be redeemed, it can be redeemed at a cashier or by an automated ticket redeeming machine. The automated ticket redeeming machine receives a ticket and dispenses cash automatically for the player. However, if the player is using a promotional ticket, in same cases special handling or processing may be required to process a special ticket.

Figure 13:
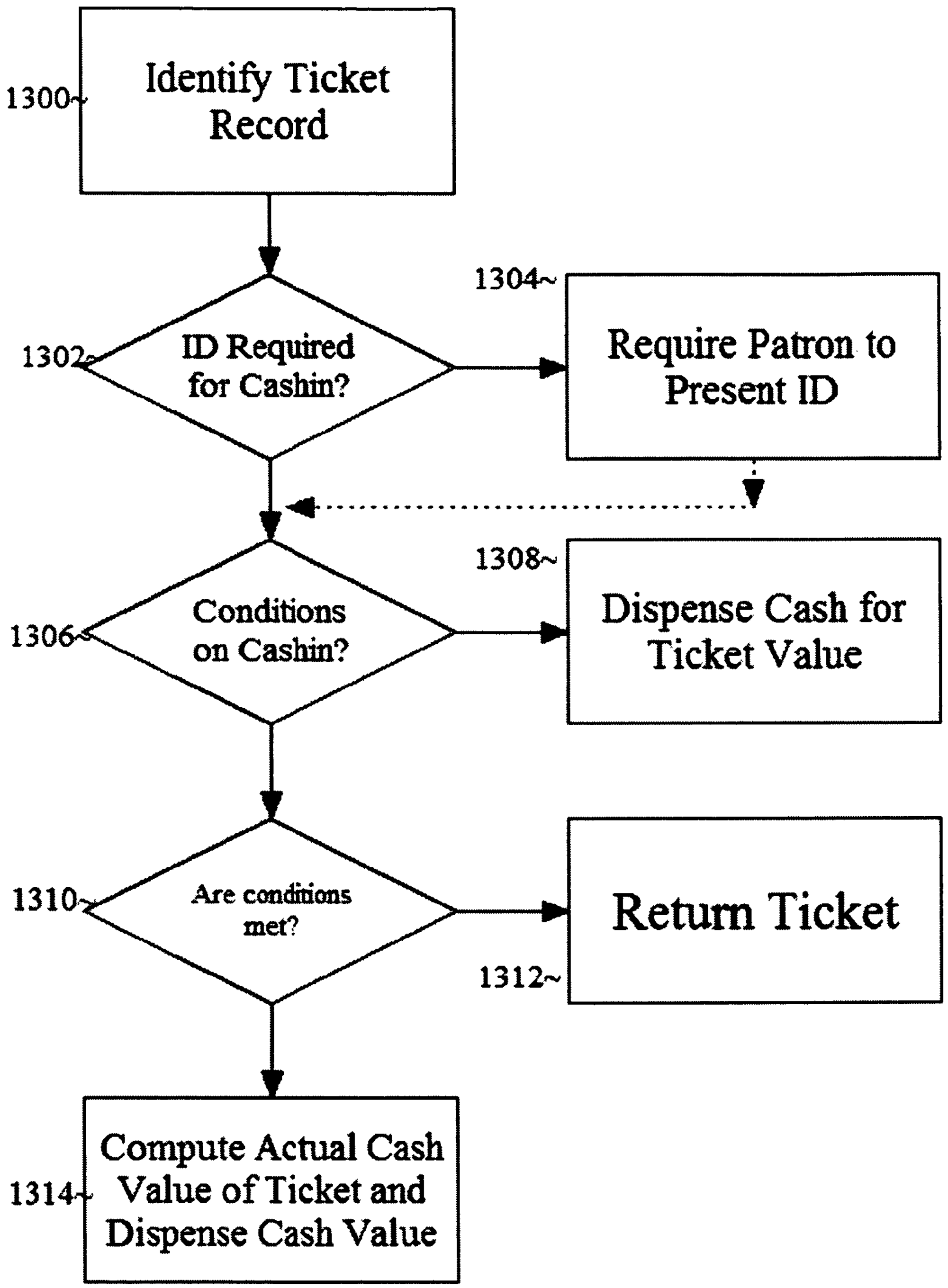
FIG. 13 is a flowchart illustrating a method for a ticket redemption machine, according to an embodiment of the present invention.

FIG. 13 is a flowchart illustrating a method for a ticket redemption machine, according to an embodiment of the present invention.

The method starts with operation 1300, which identifies a ticket record from a ticket inserted into the machine that a player wishes to receive cash for. This can be achieved as described above.

From operation 1300, the method proceeds to operation 1302 which checks if ID is required for a cash disbursement. This can be determined from the ticket record.

If the check in operation 1302 determines that ID is required for a cash disbursement, then the method proceeds to operation 1304 which would require the patron to present ID. This can be accomplished by requiring the patron to present his or her players card to the machine for verification before dispensing the money (the method can optionally continue to operation 1306), or by presenting a message that the player must go to the cashier. At the cashier, the player can present an ID to a live cashier for verification (so the name will match the name on the ticket record whom the ticket was originally assigned to), and then the cashier can dispense the money.

Note that operation 1302 is entirely optional, and if no ID is required for any ticket then from operation 1300 the method proceeds to operation 1306.

If the check in operation 1302 determines that no ID is required, then the operation proceeds to operation 1306 which determines if there are conditions on the ticket. Conditions can comprise any condition relating to the terms of the ticket that affect the value or ability to cash in. Examples of such conditions can be a playthrough requirement, noncashable amount, etc. If there are no such restrictions, then the method proceeds to operation 1308 which dispenses the cash value in exchange for the ticket. A condition for cashin may also for example be that there be a cashable amount on the ticket. For example, if a ticket has a noncashable amount of $10 but no cashable amount, then there is a condition on this ticket (to have a cashable amount) which has not been met (in operation 1310) which sends to method to operation 1312.

If the determination in operation 1306 determines that there are indeed conditions on the cashin of this ticket (from the respective ticket record), then the method proceeds to operation 1310, which determines if the conditions are met. For example, if there is a playthrough requirement, then a check is performed to determine if the player has bet the amount required for cashin. If the ticket has a noncashable amount, then a check is performed to determine if there is a cash value to this ticket no including the noncashable amount. If the conditions are not met, then the method proceeds to operation 1312 which returns the ticket with an optional message telling the player that the conditions have not been met to cash in this ticket (optionally with things the player should do so he or she can cash out, for example how much more the player needs to play).

If the determination in operation 1310 determines that conditions are met for a cashout, then the method proceeds to 1314 which dispenses the actual cash value of the ticket. Any noncashable amount may be lost.

In yet a further additional embodiment of the present invention, tickets can contain promotional messages on them. Such promotional messages can be random messages, such as 'fortunes,' special messages depending on a time issued (for example a holiday greeting around the holiday season), or targeted advertisements chosen especially for the person receiving the ticket (identified by his or her player's card).

Figure 14A:
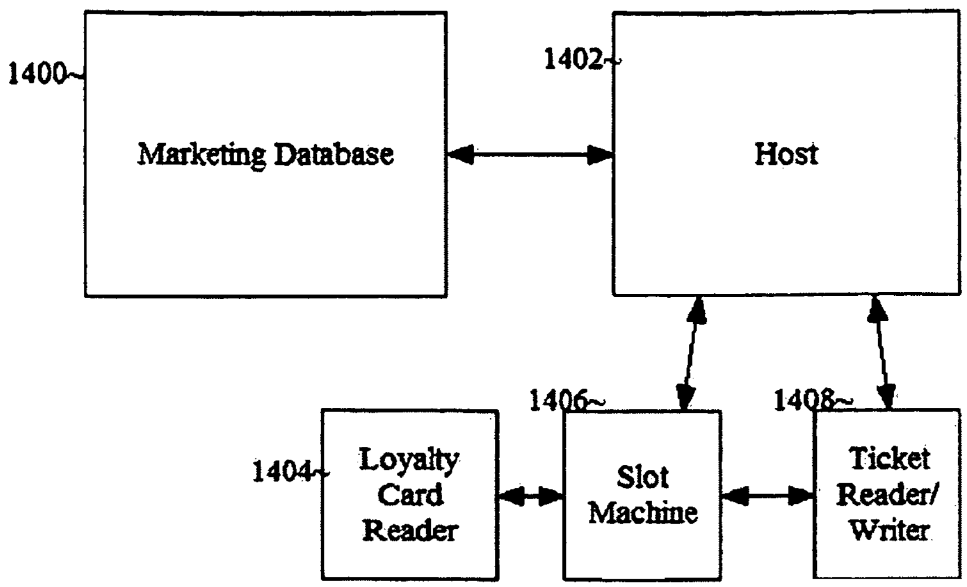
FIG. 14A is a block diagram illustrating a ticket marketing apparatus, according to an embodiment of the present invention.

FIG. 14A is a block diagram illustrating a ticket marketing apparatus, according to an embodiment of the present invention.

A host 1402 is used to generate tickets, as described above. The host 1402 connects to a slot machine 1406 and a ticket reader/writer 1408. A loyalty card reader 1404 is also connected to the slot machine 1406 and optionally the host 1402 (not pictured), or another database system such as a loyalty account database.

If the message is a "fortune" type of message (similar to a fortune cookie), then a marketing database 1400 can be used to randomly select a fortune from a plurality of predetermined fortunes, upon request by the host 1402 (typically when a player wishes to cashout and a ticket is to be generated). The selected fortune is then transmitted to the host 1402, such that the fortune is then transmitted from the host 1402 to the ticket reader/writer 1408 to print the fortune on the ticket (along with everything else on the ticket). In a less preferred embodiment, the fortune can be transmitted directly from the marketing database 1400 to the ticket reader/writer 1408. Alternatively, the marketing database 1400 may not be necessary and the data therein can be stored on the host 1402.

If a special message is desired to be printed on the ticket, for example a holiday greeting during a holiday period, then the marketing database 1400 can be programmed to transmit special messages during certain time periods. Examples of such temporal messages can comprise: "best wishes for the holiday season," "happy Halloween," happy new year!", "double points today!" etc. Further, multiple messages can be stored for the same temporal period and one of the multiple messages can be selected at random.

A targeted message can also be included on a ticket. For example, if the player the ticket is issued to is a heavy slot player, then a targeted message such as "try our Grizzly slots" can be printed on the ticket. If the player is recorded as having eaten at hotel restaurants, an advertisement may appear for a restaurant the player has not eaten at yet (at least on record).

A player's identification is first identified by the loyalty card inserted into the machine. If no loyalty card is inserted (or other identification method), then a targeted message may not be possible. Once the player is identified, a record in a loyalty database (or other casino database which contains such information) is located which contains information regarding the player's patronage. This information can include gambling information, playing history, room information, restaurants eaten at, or any information that can be collected and stored about a player. Once this information is retrieved, then it can be checked against predetermined criteria (based on the information stored about a player) to determine an appropriate message. As just one example, a player who is on record as playing a lot of a particular slot machine (i.e. grizzly slots), a message may advertise that machine, such as "try your luck again at Grizzly slots."

Figure 14B:
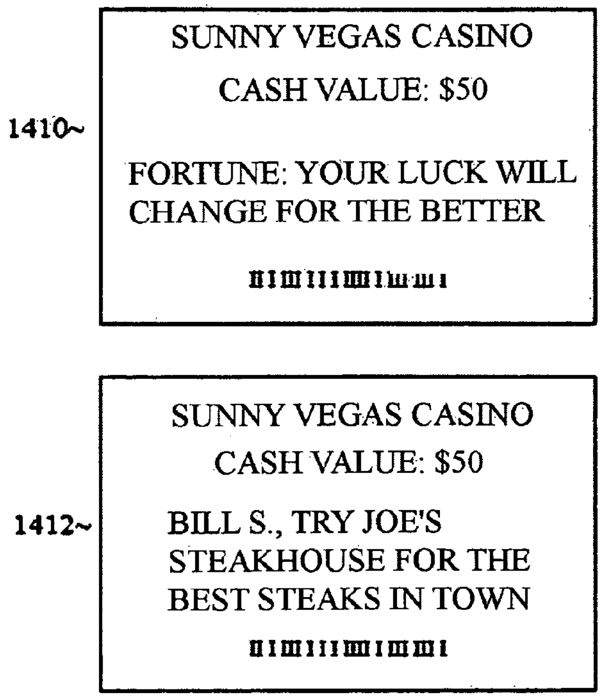
FIG. 14B is an example of marketing on tickets, according to an embodiment of the present invention.

FIG. 14B is an example of marketing on tickets, according to an embodiment of the present invention.

A fortune ticket 1410 illustrates a "fortune ticket" with a random fortune printed on the ticket.

A targeted ticket 1412 illustrates a targeted message printed on a ticket targeted to a particular person, which may even include the player's name.

Additional player related information can also be printed on the ticket, such as the player's amount of loyalty points, or any other information in the casino computers relating to a particular player.

In yet a further embodiment of the present invention, promotional tickets are ideally used in conjunction with other information the casino may have. For example, depending on a player's playing history, a casino may decide to or not to issue a promotional ticket. In addition, if a promotional ticket is issued, the terms/conditions of such a ticket can be determined by the player's playing history.

For example, a casino marketing department may decide to issue a particular kind of promotional ticket (i.e. with a playthrough requirement), to all video poker players that have a skill level (or expected value points) below a certain threshold.

The amount of the promotional ticket can also be determined by the player's skill level (or his or her expected value points). For example, a player with more expected value points should typically be entitled to a larger promotional amount.

Figure 15:
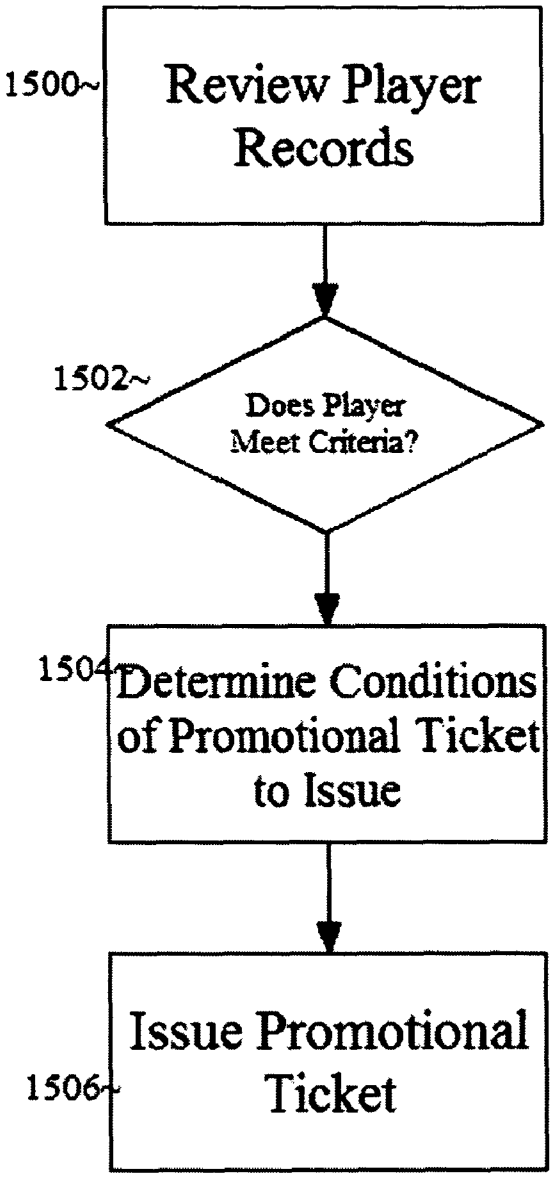
FIG. 15 is a flowchart illustrating a method of issuing promotional tickets, according to an embodiment of the present invention.

FIG. 15 is a flowchart illustrating a method of issuing promotional tickets, according to an embodiment of the present invention.

The method starts with operation 1500, which retrieves player records in a casino marketing database.

The method then proceeds to operation 1502, which checks if the player meets predefined criteria. This is done by comparing relevant fields in the player's record with predetermined criteria for received a promotion. Any of the data (or formulas) described herein can be used to determine whether a player qualifies for a promotion (and possibly how much as described below (using a same or different criteria/formula)).

If the check in operation 1502 is positive, then the method proceeds to (optional) operation 1504 which determines the conditions of the promotional ticket to issue. This can be done using a formula. For example, am amount of a promotional ticket can be based on a number of points the player has earned (any kind of points described herein, i.e. expected value points, standard comp points, etc.). The number of points can be multiplied to determine a promotion amount (with an optional cap). Alternatively, discrete promotional amounts can be used (i.e. $10, $20, $50, etc.) and depending on a range the player's relevant data falls into, the respective discrete amount can be used.

From operation 1504, the method proceeds to operation 1506, which prints the promotional ticket. It can then be mailed to the player, or given to him or her in another manner (i.e. at a slot promotions booth). Any promotional ticket described herein can also be issued to players who newly sign up for a slot club.

In yet a further embodiment of the present invention, all of the methods/apparatuses described herein can operate with a slot machine that can be automatically served software from a remote software server. A slot machine can receive additional (or replacement) games through a software server, thereby obviating the need to purchase a brand new physical platform.

Figure 16:
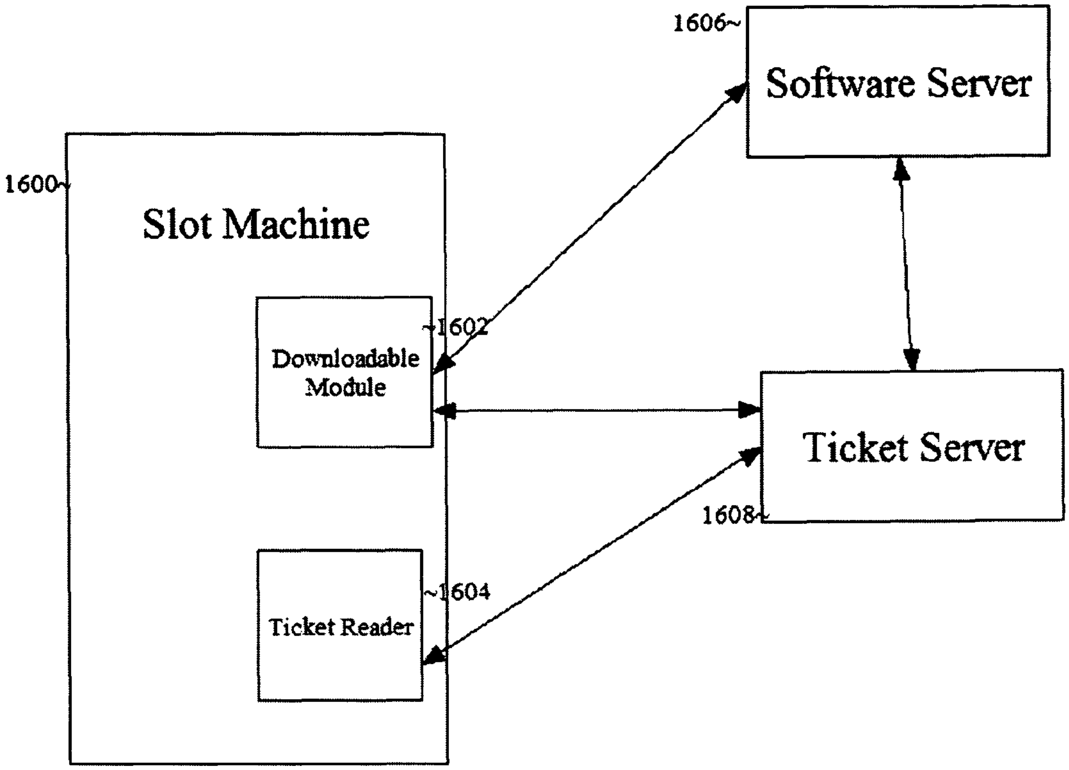
FIG. 16 is a block diagram illustrating a software serving apparatus and a ticket validating apparatus, according to an embodiment of the present invention.

FIG. 16 is a block diagram illustrating a software serving apparatus and a ticket validating apparatus, according to an embodiment of the present invention.

A software server 1606 stores games for particular game machine platforms. The software server can serve software to a slot machine 1600, so that the slot machine 1600 can store a downloadable module 1602 and play an additional (or replacement) game without a need for physically changing any components on the machine.

Embodiments of the present invention relate to using tickets for certain types of machines. A machine that is running a downloaded component can also be subject to a ticket validation or other special mode as described herein. However, the method/apparatus for initiating such a special mode may be different for a downloaded software module.

A software server 1606 serves a software module 1602 to a slot machine 1600 the software 1606 may store which type of software module(s) the slot machine 1600 is contains. When a patron inserts a ticket into a ticket reader 1604, a ticket server 1608 can determine that the particular ticket may be subject to special restrictions or a special mode, as described herein. If this is the case, then the ticket server 1608 can query the slot machine 1600 to determine the current downloadable module 1602 currently running. The query can alternatively (or additionally) be made to the software server 1606 (or related apparatus such as a status database which stores a game running on slot machines in a casino).

If the ticket server 1608 determines that the currently running downloadable module 1602 is compatible with a restriction on the particular inserted ticket, or the particular ticket should trigger a special mode on the downloadable module, then the appropriate action is taken as described herein. For example, the ticket may be credited and/or a special mode may be triggered on the machine.

It is noted this is different from the previous embodiments in which a game may be preconfigured for a machine, thus it is always static which type of game a particular machine is running. In the immediate embodiment, a game platform may run a variety of games, and thus the ticket server is in communication to know which particular game is currently being run. The respective ticket record (or programming or ticket database, etc.) should typically store (or point to) codes for each possible downloadable game so that these codes can be matched with conditions or triggers.

Thus for example, if a machine is capable of running 5 different slot games (either simultaneously at the players choice, or only one by one at the operators choice), and a ticket is targeted for "Game A," then the ticket server will query to find out which game is currently running on the slot machine.

A particular ticket can have a special operation with/for a particular machine/game (as described herein), for example a ticket could be targeted to a particular game (so if a proper match the special operation will credit the ticket), or a ticket could cause a special operation (mode) for a game (as discussed above), etc. If a particular ticket has a special operation for a currently played game, and the player changes the game with credits currently in the machine, then this can be handled in numerous ways. The credits can immediately be cashed out; or the machine be not allow such a game change; or the game will change but any special mode will be lost; or the credits may be transferred, or any alternative handling. These will all depend on design choices to which programming of the ticket server and slot machine will adhere to.

It is also noted that any and/or all of the above embodiments, configurations, variations of the present invention described above can mixed and matched and used in any combination with one another. As just one example, the verification of a player's identity by requiring the player to insert his or her player's card (as described above) can be used with any of the embodiments above. Any feature or embodiment can be added to any other feature, such as including a valid date range on a special mode ticket, etc. Any claim herein can be combined with any others (unless the results are nonsensical). Further, any mathematical formula given above also includes its mathematical equivalents, and also variations thereof such as multiplying any of the individual terms of a formula by a constant(s) or other variable.

Moreover, any description of a component or embodiment herein also includes hardware, software, and configurations which already exist in the prior art and may be necessary to the operation of such component(s) or embodiment(s).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A method, comprising:

receiving, from a player, a first cashless instrument in a gaming machine, the first cashless instrument not being entirely redeemable for cash;

crediting the gaming machine from the first cashless instrument to create credited funds on the gaming machine;

allowing the player to play the gaming machine using the credited funds, wherein the gaming machine supports supported denomination levels and the player is restricted to playing the gaming machine using a subset of the supported denomination levels, the subset being less than all of the supported denomination levels;

receiving a cashout request from the player at the gaming machine and issuing the player a second cashless instrument; and receiving, from the player, the second cashless instrument in a ticket redemption machine, wherein a record for the second cashless instrument is accessed in an electronic database, wherein the ticket redemption machine provides a cash award to the player for the second cashless instrument when the second cashless instrument reflects that the player has won at least a threshold dollar amount from the first cashless instrument.

2. The method as recited in claim 1, wherein the first cashless instrument comprises a cashable portion and a non-cashable portion.

3. The method as recited in claim 1, wherein the first cashless instrument is only operable in targeted types of gaming machines.

* * * * *